Patented Aug. 21, 1928.

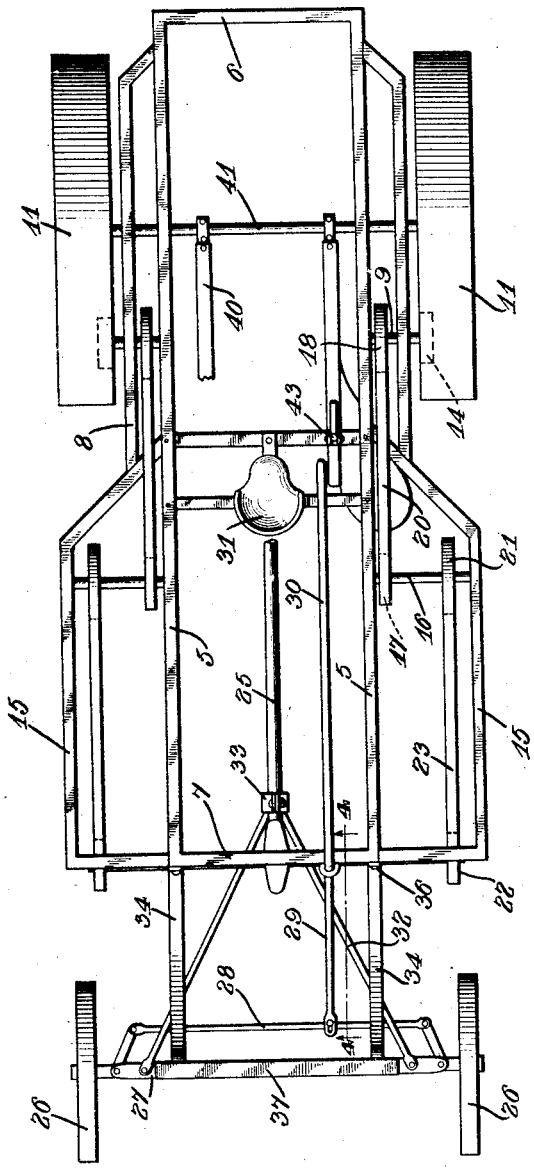

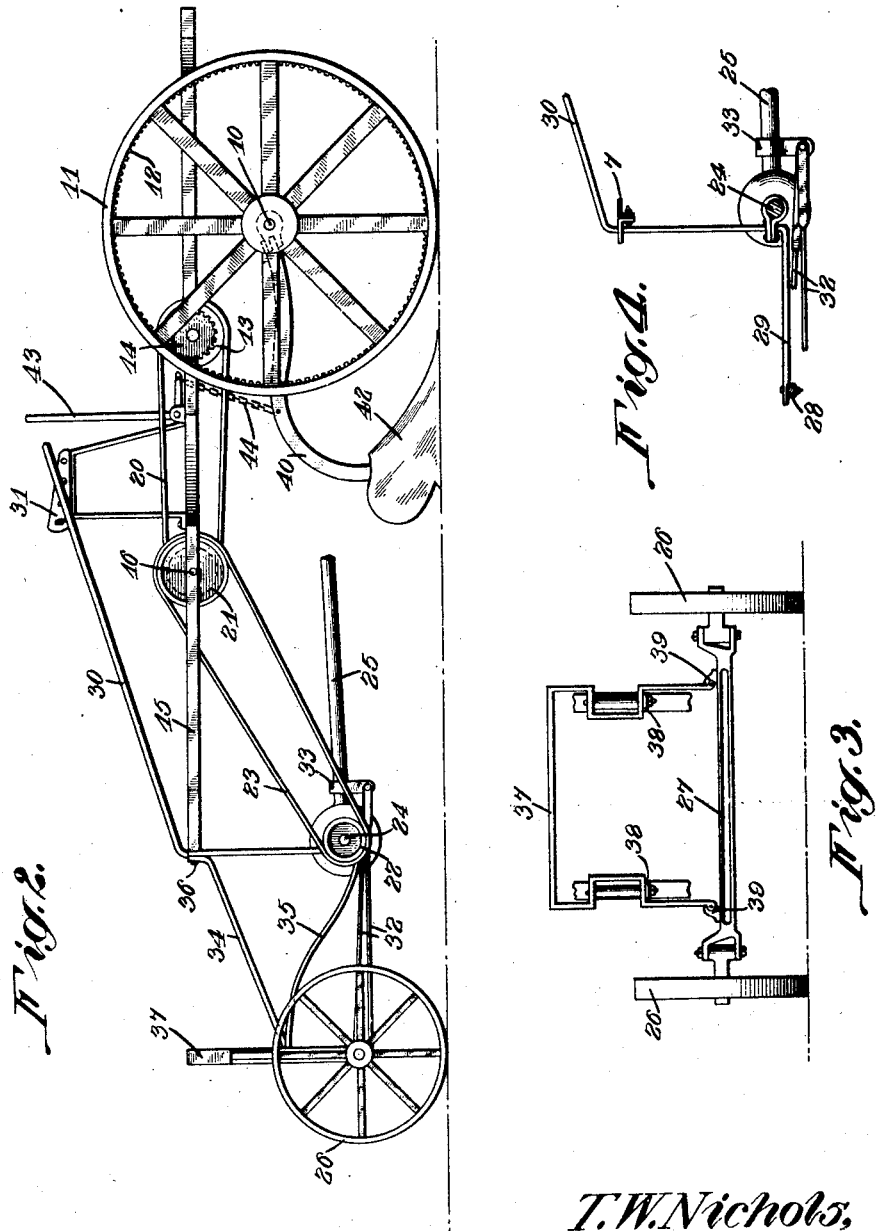

1,681,426

UNITED STATES PATENT OFFICE.

THOMPSON W. NICHOLS, OF GRAND RAPIDS, MICHIGAN.

TRACTOR.

Application filed March 23, 1923. Serial No. 627,109.

This invention has reference to tractors and more particularly to tractors especially designed for light work, the primary object of the invention being to provide a structure wherein the usual motor vehicle chassis may be converted into a tractor.

Another object of the invention is to provide means for transmitting power from the usual rear axle of the vehicle, to the bull wheels of the vehicle supported at the forward end thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of the tractor frame.

Figure 2 is a side elevational view thereof, the drive shaft being partly broken away and the motor being omitted.

Figure 3 is a rear elevational view of the tractor, parts thereof being removed.

Figure 4 is a sectional view taken on line 4—4 of Figure 1.

Referring to the drawings in detail, the reference character 5 designates the side rails of the chassis which are connected at their ends by means of the bars 6 and 7.

Auxiliary side rails 8 are disposed in spaced relation with the side rails 5 at the forward end of the tractor, the rails 8 forming with the rails 5, supports for the stub shafts 9 which are journaled in suitable openings in the rails.

The forward end of the tractor is supported by the axle 10 on which the bull wheels 11 are mounted, the bull wheels being provided with internal teeth 12 designed to mesh with the teeth 13 of the pinions 14 mounted on the outer ends of the stub shafts 9, to impart rotary movement to the bull wheels 11.

At the rear of the tractor are the rails 15 that form frames with the side rails 5 and provide supports for the shafts 16 that are shown as extending through suitable openings in the rails 5 and 15. Sprockets 17 are disposed at the inner ends of the shafts 16 and communicate rotary movement to the sprockets 18 disposed at the inner ends of the shafts 9 through the chains 20.

Sprockets 21 are also carried by the shafts 16 and receive rotary motion from the sprockets 22 as through the chains 23. These sprockets 22 are mounted at the outer ends of the usual rear axle indicated at 24 which receives motion from the usual propeller shaft mounted in the housing 25, the propeller shaft however, being connected with the motor, in the usual and well known manner, the motor, in the present showing being omitted as the motor forms no part of this invention.

The steering of the tractor is accomplished by moving the rear wheels 26 that are mounted at the outer ends of the axle 27 and operated and controlled by movement of the connecting rod 28 which in turn is operated by means of the rod 29 that has its upper extremity 30 disposed adjacent to the operator's seat 31 so that the operator may have easy access thereto to operate or guide the tractor. The axle 27 is connected to the main frame of the tractor by means of the rods 32 that have their forward ends connected with the collar 33 embracing a portion of the housing 25, as clearly shown by Figure 2 of the drawings, portions of the rods 32 engaging the usual rear axle housing to support the rear end of the main frame.

To further support the axle an auxiliary frame is provided at the rear of the tractor, the auxiliary frame including bars 34 and 35, which are arranged adjacent to the sides of the frame of the tractor and bolted thereto by means of the bolts 36, the opposite ends of the bars 34 and 35 being connected and bolted to the frame 37 at 38.

This frame 37 is swung from the usual spring hangers 39 of a well known type of motor vehicle.

Plow beams 40 are pivotally supported on the axle 41 and carry plows 42 at the rear thereof, the plows being operated by means of the hand levers 43 that are connected to the plow beams by means of the chains 34. Thus it will be seen that by movement of these levers 43, a relative movement is imparted to the plows to cause them to operate at various depths.

In the operation of the device, it is obvious that as the rear axle 24 is operated, rotary movement is imparted to the bull wheels of the tractor, to the end that the tractor may be moved over the ground surface to accomplish its purpose.

It will be of course understood that the steering of the tractor will be accomplished by the operation of the rod 29 in a manner as described.

What I claim is:—

In combination with the chassis and drive axle of a motor vehicle, the chassis including side rails, an axle at the front end of the chassis, bull wheels having internal teeth mounted on the axle, auxiliary side rails secured to the chassis in spaced relation with the side rails of the chassis, shafts supported between the side rails, pinions on the outer ends of the shafts and meshing with the internal teeth to operate the bull wheels, sprockets on the shafts, side rails arranged adjacent to the side rails of the chassis adjacent to the rear end of the chassis, shafts supported between the last mentioned rails, inner and outer sprockets mounted on each shaft, chains connecting the inner sprockets and first mentioned sprockets, sprockets on the drive axle, chains connecting the sprockets on the drive axle with the outer sprockets to transmit movement from the drive axle to the last mentioned shafts, and an auxiliary frame including guide wheels secured to the rear of the chassis.

In testimony that I claim the foregoing as my own, I have hereto affixed my signature.

THOMPSON W. NICHOLS